United States Patent

[11] 3,625,478

| [72] | Inventor | Henry R. Killian<br>Greensburg, Pa. |
|---|---|---|
| [21] | Appl. No. | 864,422 |
| [22] | Filed | Oct. 7, 1969 |
| [45] | Patented | Dec. 7, 1971 |
| [73] | Assignee | Walworth Company<br>New York, N.Y. |

[54] DUAL-ACTION BALL VALVE
2 Claims, 3 Drawing Figs.

[52] U.S. Cl. ..................................... 251/163, 251/188
[51] Int. Cl. ..................................... F16k 5/20
[50] Field of Search ........................... 251/161, 162, 163, 188

[56] References Cited
UNITED STATES PATENTS

| 3,477,690 | 11/1969 | Murota | 251/163 |
| 3,207,468 | 9/1965 | Lauducci | 251/163 X |
| 3,473,554 | 10/1969 | King | 251/163 X |

FOREIGN PATENTS

| 1,104,872 | 6/1955 | France | 251/162 |
| 1,147,569 | 6/1957 | France | 251/162 |
| 1,354,188 | 1/1964 | France | 251/163 |

*Primary Examiner*—Harold W. Weakley
*Attorney*—Melvin R. Stidham

ABSTRACT: A rotatable valve structure, such as a ball or plug valve, wherein the plug working surface may be tilted into sealing engagement with the seat. A camming surface on the upper shaft of the rotary member slidably engages a complementary surface on the rotary member to produce transverse movement of the rotary valve member in response to axial movement of the shaft. Hence, the valve closure surface may be turned to a face-to-face position relative to the seat and then, in response to axial movement of the camming shaft, it is tilted and pressed into firm seating engagement.

INVENTOR.
HENRY R. KILLIAN

INVENTOR.
HENRY R. KILLIAN

3,625,478

DUAL-ACTION BALL VALVE

BACKGROUND OF THE INVENTION

This invention relates to a dual-action rotary valve and, more particularly, to a ball valve which may be moved axially of the flow passage into and out of positive sealing engagement with the valve seat so that it may be rotated free of frictional engagement with the seat.

In conventional quarter-turn valves wherein a valve closure member is rotated through 90° between open and closed position, the closure member slides across valve seats on the body during such movement. However, in certain installations, such as in vacuum systems, wherein there can be no lubricating medium, or in cryogenic or elevated temperature use, wherein material may be particularly susceptible to damage, sliding engagement of sealing surfaces is best avoided. Moreover, in many ball and plug valves, where the seal is achieved solely through peripheral sealing engagement of the body plug with the complementary body seat member surrounding the flow passage, there is no provision for positive biasing means to force the complementary sealing surfaces together.

Accordingly, it is an object of this invention to provide a rotatable valve plug which is turned into alignment with a cooperating seat and then tilted axially of the flow passage into firm engagement with the seat.

It is a further object of this invention to provide a quarter-turn valve with a capability of achieving tight closure even in absence of elastomeric seals.

It is a further object of this invention to provide a rotatable valve plug which is moved axially of the pipeline into and out of sealing engagement with a complementary valve seat.

It is a further object of this invention to provide a quarter-turn valve which may be operated without relative sliding movement between the sealing surfaces.

It is a further object of this invention to provide a rotatable valve which may also be moved axially without rotatable cam members.

It is a further object of this invention to provide a fluid flow control valve, the closure member of which may be rotated about an axis normal to the flow path and moved along the flow path into nonabrading engagement with the valve seat.

It is further object of this invention to provide a plug valve which may be turned through 90° into alignment with a seat and then moved axially into firm seating engagement, all in response to simple rotational movement of the shaft.

It is a further object of this invention to provide a valve in which wear and tolerance buildup are not severely critical.

It is a further object of this invention to provide a plug valve with a sealing disc that is mounted on a rotor for adjustment axially of the flow passage in order to compensate for seat wear.

Other objects and advantages of this invention will become apparent from the detailed description herein when read in conjunction with the accompanying drawing.

SUMMARY OF THE INVENTION

This invention contemplates a rotary valve closure member wherein its lower trunnion is fixed to a pivoting shaft and the upper trunnion is axially slidable, but nonrotatable, on its shaft. Sloping cam surfaces on the slidable shaft and the rotor upper trunnion force the rotor to move along the axis of the valve flow passages as the slidable shaft is moved along its axis. The lower trunnion shaft is mounted in a ball-and-socket connection with the body so that the rotor may be rotated and tilted as the upper slidable trunnion cams it over. Hence, the valve may be rotated through 90° between open and closed position at all times free of engagement with the sealing surface on the body. Then, by moving the slidable shaft along its axis, the cam surfaces on the shaft and the rotor tilt the rotor until a working surface thereon is pressed into firm sealing engagement with the stationary seat. To open the valve, the shaft is moved in the opposite direction along its axis to retract the closure disc from the seat. Thereafter, it may be rotated to open position without sliding against the sealing surfaces. Both the rotational and the axial movement of the shaft is produced in response to simple rotational movement of an upper shaft drive sleeve. The working surface that engages the seat is on a ring which is threaded onto a carrier pivotably mounted on the rotor. Hence, the pivotal mounting enables the working surface to adjust to seat irregularities and the threaded mounting enables it to be adjusted axially of the flow passage to compensate for wear or tolerance buildup.

DESCRIPTION OF A PREFERRED EMBODIMENT

Figure 1:
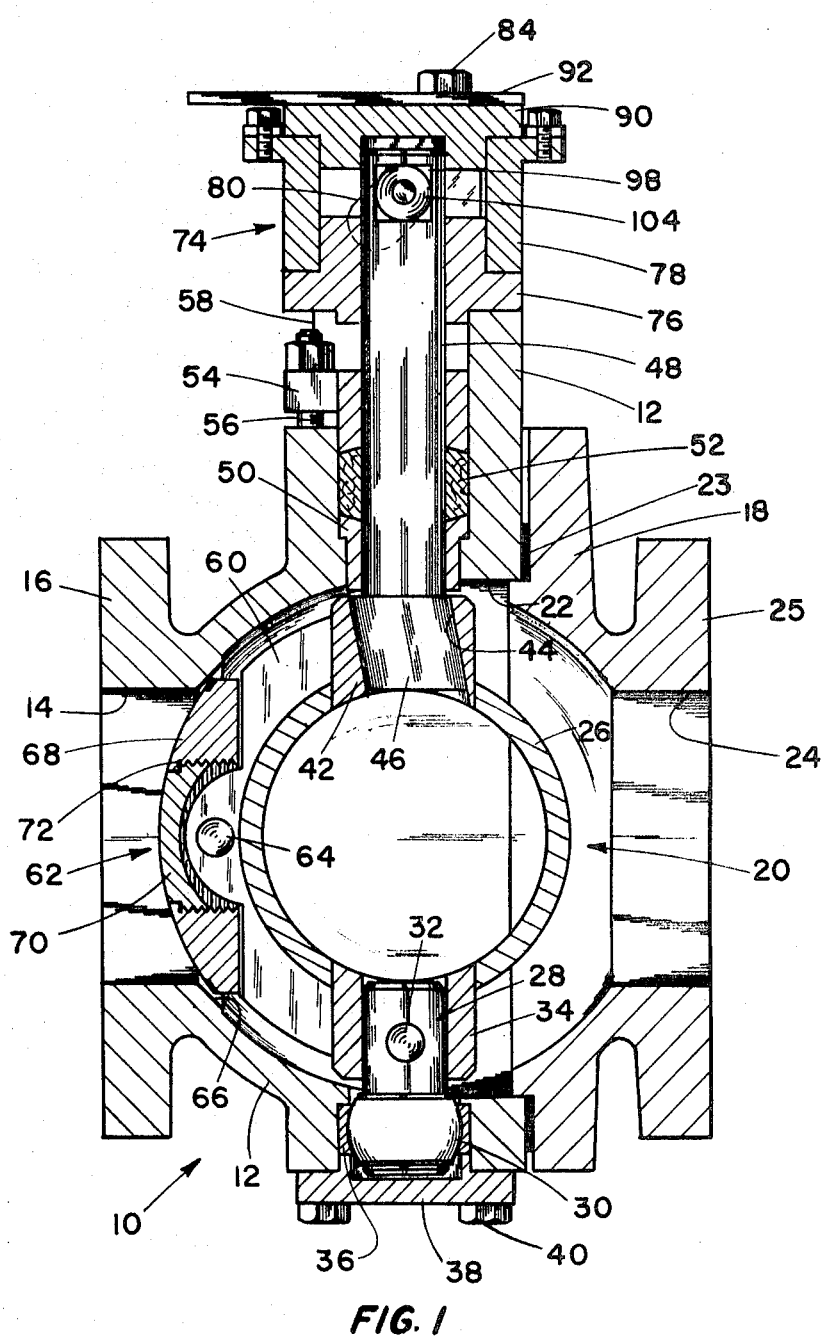
FIG. 1 is a vertical section view of a ball valve embodying features of this invention in its closed and unsealed position.
Figure 2:
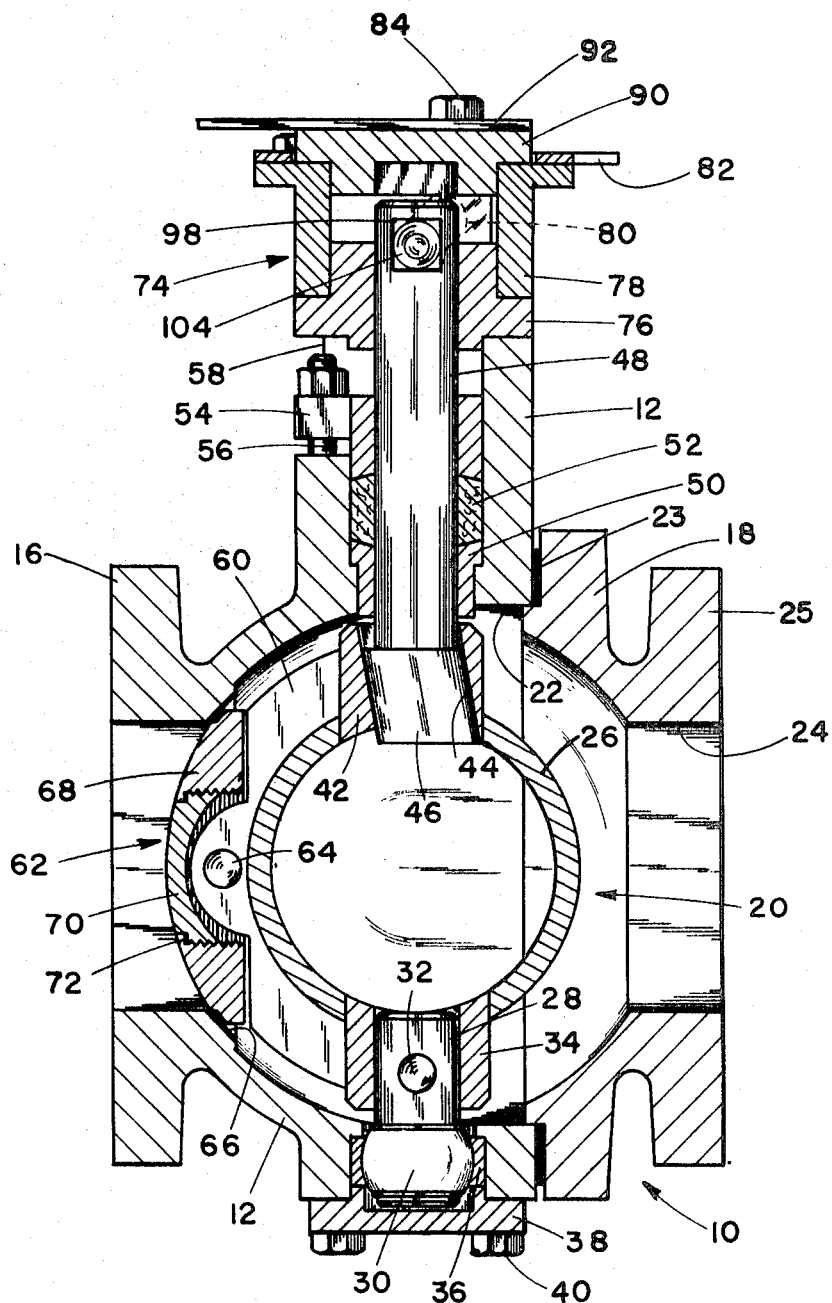
FIG. 2 is a vertical section view of the ball valve in its closed and sealed position.

Now referring to FIGS. 1 and 2 with greater particularity, there is shown a ball valve 10 including a main valve body section 12 with a flow passage 14 and suitable means, such as a flange 16 for connection into a pipeline. A body closure 18 is bolted or otherwise secured to the main valve section 12 after the valve rotor 20 is inserted through the opening 22, and the enclosure is sealed at 23. The body closure member also is provided with a flow passage 24 and suitable means such as the flange 25 for attachment into a pipeline.

The valve rotor 20 includes a cylindrical sleeve 26 which functions as a flow passage to align with those in the body and end closure member. A stub shaft 28 having a lower spherical portion 30 is secured to the bottom of the rotor 20 as by pinning it at 32 to a trunnion 34 on the rotor. The spherical portion 30 of the stub shaft 28 is received in a complementary split bearing 36, which is held in place in the body as by means of the cover plate 38 secured by bolts 40. The spherical surface on the stub shaft and the complementary bearing form a ball-and-socket coupling to permit both rotation and rocking of the rotor for a purpose hereinafter to be described.

Extending from the upper end of the rotor diametrically opposite to the stub shaft is a rotor trunnion 42 which is bored with a sloping oblique cylindrical opening 44 in which is received a complementary oblique cylindrical slide 46 carried on the lower end of a shaft 48. The shaft is rotatably and slidably received in a bearing 50. Hence, it will be apparent that rotation of the shaft 48 will be transmitted to the rotor to turn it between a position aligned with the body flow passages and one where, as shown in FIG. 1, it is normal thereto. It will also be apparent that axial movement of the shaft 48 will produce lateral movement of the slide-bearing member and, hence, a tilting or rocking of the rotor 20.

A stem packing 52 and a packing gland 54 are provided to seal off the valve body 12 around the shaft 48. Adjustment screws 56 extending through ears on the gland 54 are reached through slots 58 cut in the body 12.

Secured to one side of the rotor is a concentric, arcuate mounting plate 60 for the valve-sealing disc 62 which is pivotally carried at 64 to adjust itself into a seating relationship with hardened valve-seating surfaces 66 on the body 12. Preferably, the valve disc 62 is formed in two parts with an annular sealing ring 68 being threaded on a carrier portion 70 so that it may be adjusted axially within limits in order to compensate for wear or for an accumulation of tolerances which would otherwise make precise sealing difficult. A seal ring 72 is provided to seal between the sealing ring and the carrier.

Figure 3:
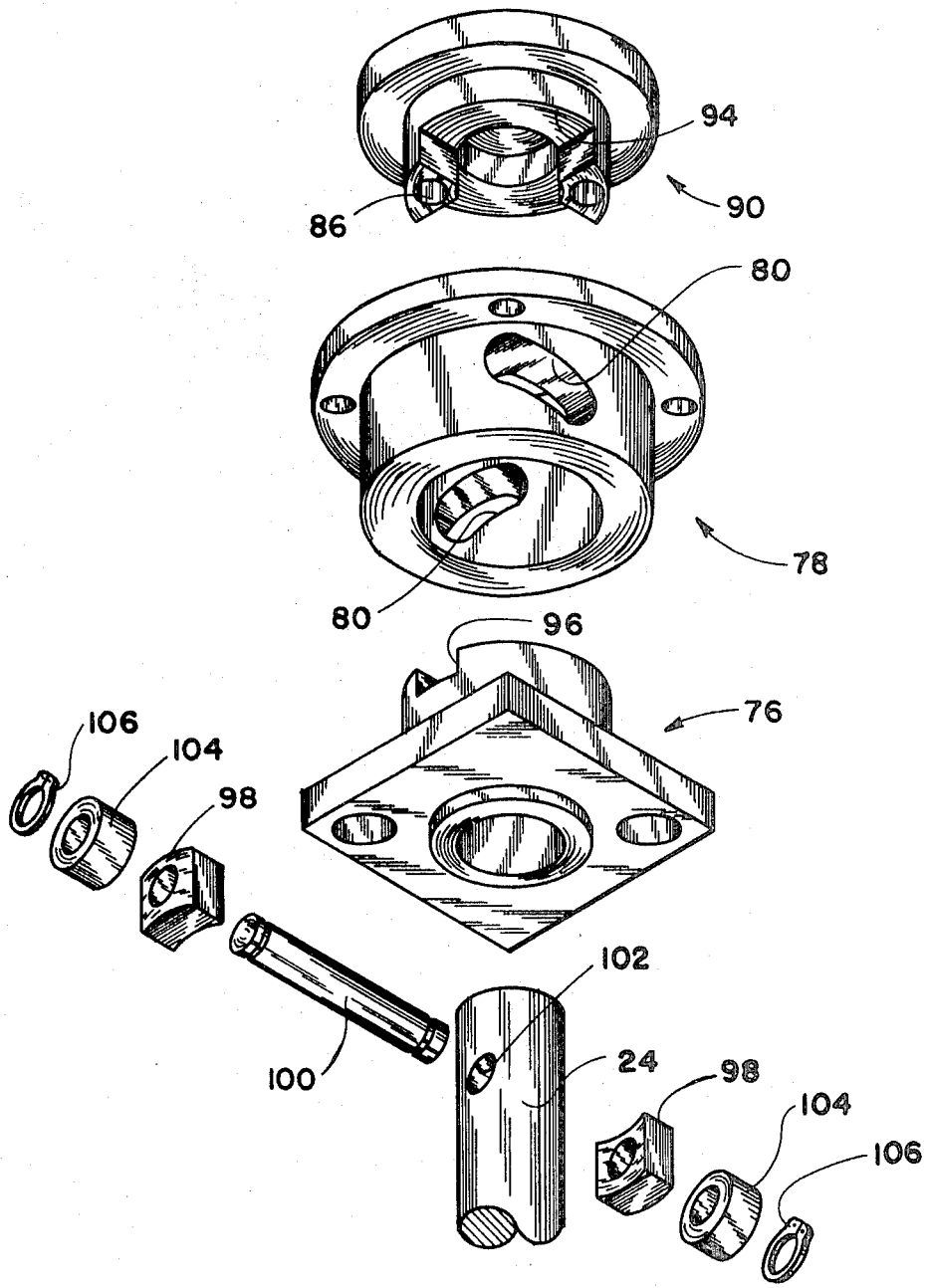
FIG. 3 is an exploded view of the operating mechanism.

In operation, the shaft 48 may be rotated through 90° to move the rotor to the position shown in FIG. 1, and, thereafter, the shaft may be pushed down so that the complementary oblique cylindrical surfaces 44,46 cam the upper portion of the rotor 20 to the left to bring it into the position shown in FIG. 2 wherein the seal ring 68 on the rotor is seated firmly against the hardened valve seats 66 of the body. The mechanism for operating the valve through the abovedescribed compound movements with just a simple turning movement through a little more than 90° is shown in the exploded view of FIG. 3. Considering this view in conjunction with FIGS. 1 and 2, the operator 74 includes a pilot sleeve 76 which is secured to the body 12 and slidably and rotatably receives the shaft 48. A drive sleeve 78 having a pair of opposed sloping slots 80 is rotatably carried on the pilot sleeve 76 to turn freely thereon, the drive sleeve being turned as by means of a suitable handle 82 (FIG. 2). Secured to the pilot sleeve as by means of bolts 84 extending through accommodating holes 86 is a pilot sleeve cap 90 which carries a quadrant plate 92 to indicate the position of the valve rotor 20. The pilot sleeve cap has opposing horizontal slots 94, and the pilot sleeve has opposed vertical slots 96. The horizontal and vertical slots 94 and 96 together form L-shaped slots which receive pilot sleeve cams 98 carried on a pin 100 extending through a hole 102 in the upper end of the shaft 48. On the outside of the pilot sleeve cams 98 are drive sleeve cams 102 which are received in the sloping slots 80 of the drive sleeve 78. The cams 98 and 104 may be held in place on the pin 100 by means of clips 106.

In operation of the device from open position, the drive sleeve is first turned through the approximate 90° arc of the horizontal pilot sleeve slot, and the engagement of the drive sleeve cams 104 with the walls of the sloping slots 80 will rotate the shaft 48 with it to the position shown in FIG. 1. With the pilot sleeve cams 98 at the ends of the horizontal slots 94, the shaft is locked against further rotation. Consequently, further rotation of the drive sleeve 78 will cause it to move relative to the now-stationary drive sleeve cams 104, and they will move down the slopes of the sloping slots 80, this axial movement of the shaft 48 being enabled by reason of the vertical portion 96 of the L-shaped slot in the pilot sleeve 76. Hence, the shaft will be driven downward to the position shown in FIG. 2, and the rotor 20 will tilt to press the sealing disc 68 into firm sealing engagement on the seat 66.

While this invention has been described in conjunction with preferred embodiments thereof, it is obvious that modifications and changes therein may be made by those skilled in the art without departing from this invention.

What is claimed is:

1. A rotatable valve structure comprising:
   a valve body having a flow passageway therethrough,
   a valve seat surface in said body around said flow passageway and facing in one direction,
   a rotor,
   a valve disc having a working surface thereon pivotably carried on said rotor and adapted to engage said seat surface and block flow of fluid through said passageway,
   a bearing sleeve on said body generally parallel to said valve seat and displaced therefrom in said one direction,
   a main shaft member rotatably received in said bearing sleeve on one side of said rotor,
   an oblique cylindrical cam member on the inner end of said shaft member,
   a complementary oblique cylindrical ramp receptacle on said rotor slidably receiving said cam member,
   said ramp receptacle being disposed closely adjacent said bearing sleeve, and
   a pivotable and rotatable ball-and-socket connection between said rotor and said body diametrically opposite said main shaft member and closely adjacent said rotor,
   said ball-and-socket connection comprising substantial, slidably engaging, complementary internal and external spherical surfaces on said rotor and said body,
   said valve disc when aligned with said valve seat being held in sealing engagement therewith in one axial position of said main shaft member and being displaced therefrom in said one direction when said shaft member is moved axially from said one axial position,
   said valve disc comprising:
   a disc carrier pivotably mounted on said rotor about a pivot axis normal to the axes of said main shaft member and said flow passageway,
   a disc with said working surface thereon supported on said disc carrier for movement thereon toward and away from said pivot axis.

2. The rotatable valve structure defined by claim 1 wherein:
   said external spherical surface extends on both sides of that circular section of said internal spherical surface which is normal to the axis of said shaft member.

* * * * *